US012061081B2

(12) United States Patent
Rajavenkatanarayanan et al.

(10) Patent No.: US 12,061,081 B2
(45) Date of Patent: Aug. 13, 2024

(54) AUTOMATIC WHEEL ALIGNMENT DETECTION SYSTEM AND METHOD FOR A VEHICLE

(71) Applicant: GM Global Technology Operations LLC, Detroit, MI (US)

(72) Inventors: Akilesh Rajavenkatanarayanan, Macomb, MI (US); Ke Liu, Lexington, MA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 383 days.

(21) Appl. No.: 17/691,452

(22) Filed: Mar. 10, 2022

(65) Prior Publication Data

US 2023/0288195 A1    Sep. 14, 2023

(51) Int. Cl.
*G01B 11/275* (2006.01)
*B60K 35/00* (2006.01)
*B60K 35/28* (2024.01)
*B60K 35/29* (2024.01)

(52) U.S. Cl.
CPC ............ *G01B 11/275* (2013.01); *B60K 35/00* (2013.01); *B60K 35/28* (2024.01); *B60K 35/29* (2024.01); *B60K 2360/161* (2024.01); *B60K 2360/178* (2024.01); *B60K 2360/1876* (2024.01); *G01B 2210/26* (2013.01)

(58) Field of Classification Search
None
See application file for complete search history.

(56) References Cited

U.S. PATENT DOCUMENTS

2021/0357645 A1\* 11/2021 Messer ................ G06V 10/764
2021/0402984 A1\* 12/2021 Funke ..................... B62D 7/06

\* cited by examiner

*Primary Examiner* — John F Mortell
(74) *Attorney, Agent, or Firm* — Vivacqua Crane, PLLC

(57) ABSTRACT

A wheel alignment detection system for a vehicle includes a plurality of sensors and a controller. Each of the plurality of sensors is configured to generate a signal. The controller is in communication with the plurality of sensors and is configured to: detect an external force exerted on the vehicle based on the signal from at least one of the plurality of sensors; determine whether the external force exerted on the vehicle has a magnitude that is between a first predetermined value and a second predetermined value; and command the vehicle to provide an alert in response to determining that the magnitude of the external force exerted on the vehicle is between the first predetermined value and the second predetermined value, wherein the alert is indicative that a wheel alignment check should be performed.

16 Claims, 6 Drawing Sheets

AUTOMATIC WHEEL ALIGNMENT DETECTION SYSTEM AND METHOD FOR A VEHICLE

TECHNICAL FIELD

The present disclosure relates to an automatic wheel alignment detection system and method for a vehicle.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles include wheels and tires coupled to the wheels. During use, the wheels may become misaligned due to a variety of reasons. Regardless of the specific reasons, wheel alignment checks should be conducted regularly to extend the life of the vehicle tires. It is therefore desirable to develop a method and system for automatically detecting wheel misalignment.

SUMMARY

The present disclosure describes a system and method for automatic wheel alignment detection. The presently disclosed system provides vehicle users with a visual representation of the wheel alignment or misalignment, thereby helping a vehicle user determine whether the vehicle wheels should be aligned. In the presently disclosed system and method, vehicle sensors, such as Inertial Measurement Units (IMUs), are used to detect events that may cause wheel misalignment and, in response, the vehicle user is notified that an automatic wheel alignment check should be performed. During this automatic wheel alignment check, sensors, such as cameras and IMUs, are used to check whether the vehicle travels in a straight path when commanded to do so, thereby allowing the vehicle user to determine whether the wheels are misaligned. Because of the capabilities of the presently disclosed system and method, vehicle users no longer have to guess whether the vehicle wheels are misaligned. Rather, the presently disclosed system and method provide vehicle users with a reliable way to automatically check wheel alignment, enabling the vehicle users to take timely remedial action to extend the life of the vehicle tires.

In an aspect of the present disclosure, the wheel alignment detection system for the vehicle includes a plurality of sensors and a controller. Each of the plurality of sensors is configured to generate a signal. The controller is in communication with the plurality of sensors and is configured to: detect an external force exerted on the vehicle based on the signal from at least one of the plurality of sensors; determine whether the external force exerted on the vehicle has a magnitude that is between a first predetermined value and a second predetermined value; and command the vehicle to provide an alert in response to determining that the magnitude of the external force exerted on the vehicle is between the first predetermined value and the second predetermined value. The alert is indicative that a wheel alignment check should be performed.

In an aspect of the present disclosure, the system further includes a display in communication with the controller. The controller is configured to command the display to display the alert that is indicative that the wheel alignment check should be performed.

In an aspect of the present disclosure, the controller is configured to: monitor a distance traveled by the vehicle; determine whether the distance traveled by the vehicle is equal to or greater than a predetermined distance threshold; and command the display to display the alert in response to determining that the distance traveled by the vehicle is equal to or greater than the predetermined distance threshold.

In an aspect of the present disclosure, the system further includes at least one airbag in the vehicle. The airbag is in communication with the controller, and the controller is configured to: determine that the magnitude of the external force exerted on the vehicle is greater than a third predetermined value. The third predetermined value is greater than the first predetermined value and the second predetermined value. The controller is further configured to: determine if at least one airbag has been deployed based on the signal from at least one of the plurality of sensors; and command the display to provide the alert in response to determining that at least one airbag has not been deployed and determining that the magnitude of the external force exerted on the vehicle is greater than the third predetermined value. As discussed above, the alert is indicative that a wheel alignment check should be performed.

In an aspect of the present disclosure, the controller is configured to: command the display to provide a selection prompt to allow a vehicle user to select whether to perform the wheel alignment check while providing the alert; and receiving a user input by the vehicle user. The user input is a selection by the vehicle user to perform the wheel alignment check. The controller is further configured to: determine that the vehicle user wants to perform the wheel alignment check based on the user input; and command the vehicle to perform the wheel alignment check in response to receiving the user input.

In an aspect of the present disclosure, the controller is configured to: determine an actual vehicle path of the vehicle while the vehicle is moving based on the signal from at least one of the plurality of sensors; compare the actual vehicle path of the vehicle with a predetermined expected path to determine a path offset; and determine whether the path offset is greater than a predetermined offset threshold.

In an aspect of the present disclosure, the controller is configured to: generate an image showing the actual vehicle path overlapping or deviation from the predetermined expected path in response to determining that the path offset is greater than the predetermined offset threshold; and command the display to display the image showing the actual vehicle path overlapping or deviating from the predetermined expected path.

In an aspect of the present disclosure, the wheel alignment check is performed automatically by the vehicle, and the vehicle operates autonomously.

In an aspect of the present disclosure, the controller is configured to: instruct the vehicle user to position a steering wheel of the vehicle such that the vehicle moves in a straight path; and instruct the vehicle user to accelerate the vehicle to a predetermined speed without altering a position of the steering wheel.

In an aspect of the present disclosure, the controller is configured to command the display to show the results of the wheel alignment check. The controller is also configured to detect wheel misalignment and in response to detecting wheel misalignment, perform at least one of: (1) provide the vehicle user with nearby auto shop options and receiving an auto shop selection from the vehicle user to fix the wheel alignment; (2) assist the vehicle user to make a reservation at one of the nearby auto shop options to fix the wheel alignment later; or (3) provide the vehicle user with reminders in the future at predetermined time interval.

The present disclosure also describes a wheel alignment detection method for a vehicle. In an aspect of the present disclosure, the method includes: detecting an external force exerted on the vehicle; determining whether a magnitude of the external force exerted on the vehicle is between a first predetermined value and a second predetermined value; and commanding the vehicle to provide an alert in response to determining that the external force exerted on the vehicle is between the first predetermined value and the second predetermined value. The alert is indicative that a wheel alignment check should be performed.

In an aspect of the present disclosure, the method further includes commanding a display of the vehicle to display the alert to a vehicle user.

In an aspect of the present disclosure, the method further includes monitoring a distance traveled by the vehicle; determining whether the distance traveled by the vehicle is equal to or greater than a predetermined distance threshold; and commanding the vehicle to provide the alert in response to determining that the distance traveled by the vehicle is equal to or greater than the predetermined distance threshold.

In an aspect of the present disclosure, the method further includes detecting that the magnitude of the external force exerted on the vehicle is greater than a third predetermined value. The third predetermined value is greater than the first predetermined value and the second predetermined value. The method further includes determining whether at least one airbag in the vehicle has been deployed and commanding the vehicle to provide the alert in response to determining that the at least one airbag has not been deployed and detecting that the magnitude of the external force exerted on the vehicle is greater than the third predetermined value.

In an aspect of the present disclosure, the method further includes prompting a vehicle user to select whether to perform the wheel alignment check in response to providing the alert. A selection of the vehicle user is a user input. The method further includes commanding the vehicle to perform the wheel alignment check in response to receiving the user input that the wheel alignment check will be performed.

In an aspect of the present disclosure, the method further includes detecting an actual vehicle path while the vehicle is in motion and comparing the actual vehicle path of the vehicle with a predetermined expected path to determine a path offset. Also, the method includes determining whether the path offset is greater than a predetermined offset threshold.

In an aspect of the present disclosure, the method further includes generating an image showing the actual vehicle path overlapping the predetermined expected path in response to determining that the path offset is greater than the predetermined offset threshold and commanding a display of the vehicle to display the image showing the actual vehicle path overlapping or deviating the predetermined expected path.

In an aspect of the present disclosure, the wheel alignment check is performed automatically by the vehicle.

In an aspect of the present disclosure, the method further includes instructing the vehicle user to position a steering wheel of the vehicle such that the vehicle moves in a straight path and instructing the vehicle user to accelerate the vehicle to a predetermined speed without altering a position of the steering wheel.

In an aspect of the present disclosure, the method further includes displaying the results of the wheel alignment check.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
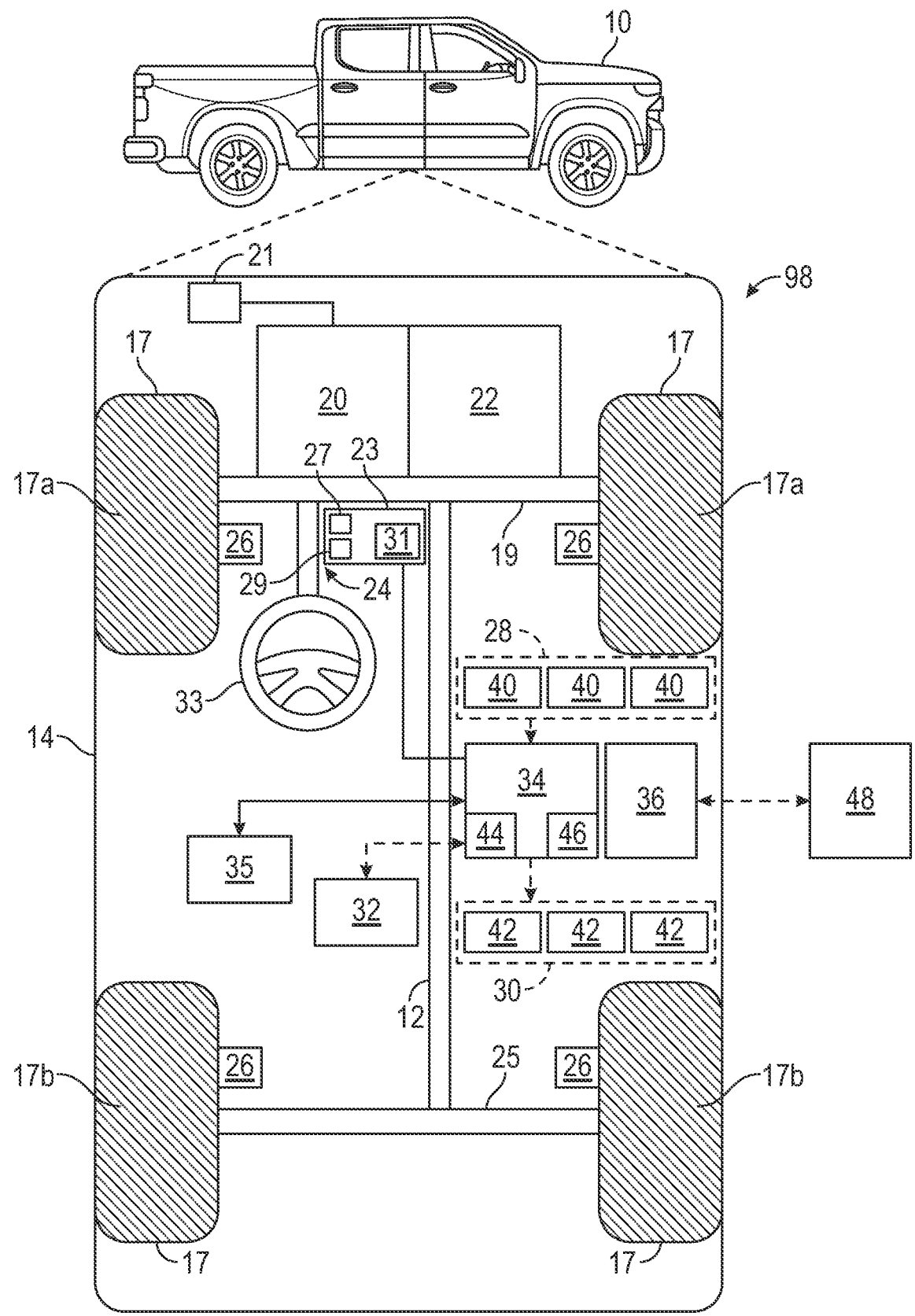
FIG. 1 is a block diagram depicting an embodiment of a vehicle including an automatic wheel alignment detection system.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale.

With reference to FIG. 1, a vehicle 10 generally includes a chassis 12, a body 14, and front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

In various embodiments, the vehicle 10 may be an autonomous vehicle and a control system 98 is incorporated into the vehicle 10. The control system 98 may be referred to as the system or the automatic wheel alignment detection system. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may be a so-called a Level Two, a Level Three, Level Four, or Level Five automation system. A Level Four system indicates "high automation", referring to the driving mode-specific performance by an automated driving system of aspects of the dynamic driving task, even if a human driver does not respond appropriately to a request to intervene. A Level Five system indicates "full automation", referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more odometers, one or more ground penetrating radar (GPR) sensors, one or more steering angle sensors, one or more tire pressure sensors, one or more cameras (e.g., optical cameras and/or thermal cameras, such as a rear camera and/or a front camera), one or more gyroscopes, one or more accelerometers, one or more speed sensors, one or more steering angle sensors, one or more ultrasonic sensors, one or more inertial measurement units (IMUs) and/or other sensors. Each sensor 40 is configured to generate a signal that is indicative of the sensed observable conditions of the exterior environment and/or the interior environment of the vehicle 10. Because the sensor system 28 provides data to the controller 34, the sensor system 28 and its sensors 40 are considered sources of information (or simply sources).

The sensor system 28 includes one or more Global Navigation Satellite System (GNSS) transceivers (e.g., Global Positioning System (GPS) transceivers) configured to detect and monitor the route data (i.e., route information). The GNSS transceivers are configured to communicate with a GNSS to locate the position of the vehicle 10 in the globe. The GNSS transceivers are in electronic communication with the controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored on the data storage device 32. The data storage device 32 may be part of the controller 34, separate from the controller 34, or part of the controller 34 and part of a separate system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force exerted on the vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 is programmed to execute a wheel alignment detection method 100 (FIG. 2) described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98. The vehicle 10 includes a user interface 23, which may be a touchscreen in the dashboard. The user interface 23 may include, but is not limited to, one or more speakers 27 to provide a sound, a haptic feedback in a vehicle seat or other object, one or more displays 29, one or more microphones 31 and/or other devices suitable to provide a notification to the vehicle user of the vehicle 10 or receive input from the vehicle user. The user interface 23 is in electronic communication with the controller 34 and is configured to receive inputs from a vehicle user (e.g., vehicle operator). For example, the user interface 23 may include a touch screen and/or buttons configured to receive inputs from a vehicle user. Accordingly, the controller 34 is configured to receive inputs from the user via the user interface 23. The display 29 may be configured as a heads-up display (HUD), an information cluster display, and/or an infotainment center display. Regardless of its configuration, the display 29 is capable of displaying information to the vehicle user (e.g., vehicle operator or passenger). The speakers 27 are capable of providing an auditable notification to the vehicle user.

The communication system 36 is in communication with the controller 34 and is configured to wirelessly communicate information to and from other entities 48, such as but not limited to, other vehicles ("V2V" communication), infrastructure ("V2I" communication), remote systems at a remote call center (e.g., ON-STAR by GENERAL MOTORS) and/or personal devices. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs). The communication system 36 is configured to wirelessly communicate information between the vehicle 10 and another vehicle. Further, the communication system 36 is configured to wirelessly communicate information between the vehicle 10 and infrastructure or other vehicles.

Figure 2:
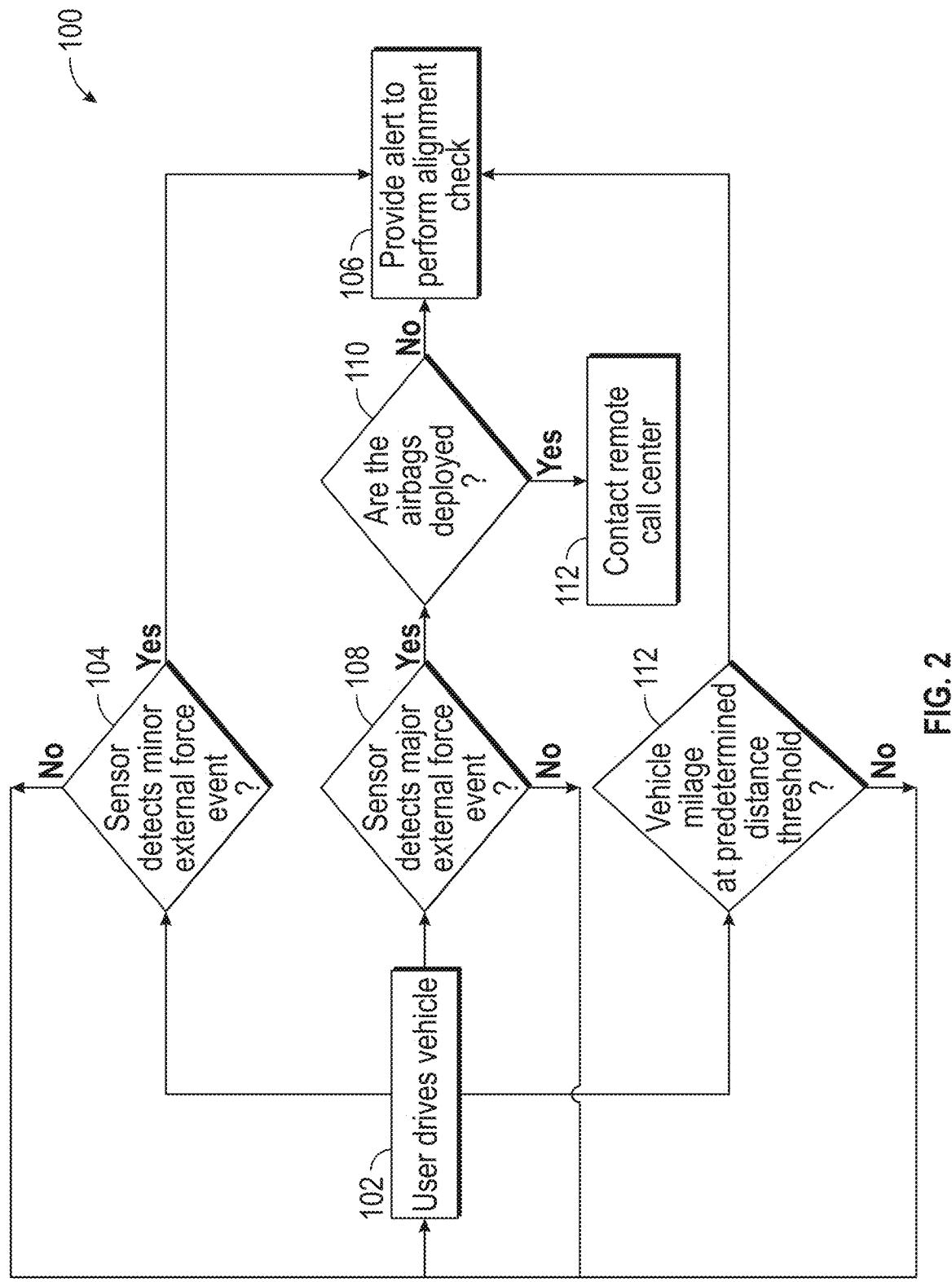
FIG. 2 is a flowchart of part of an automatic wheel alignment detection method according to an embodiment of the present disclosure.

FIG. 2 is a flowchart of part of the wheel alignment detection method 100. The method 100 or parts thereof may be implemented in a computer program product embodied in a computer readable media 46 and including instructions usable by the processor 44 of the controller 34 to cause the control system 98 to implement one or more of the method instructions. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one computer or on multiple computers in communication with one another.

The program(s) may be embodied on computer readable media 46, which can be non-transitory and can include one or more storage devices, articles of manufacture, or the like. Exemplary computer readable media 46 include computer system memory, e.g., RAM (random access memory), ROM (read only memory); semiconductor memory, e.g., EPROM (erasable, programmable ROM), EEPROM (electrically erasable, programmable ROM), flash memory; magnetic or optical disks or tapes; and/or the like. The computer readable media 46 may also include computer-to-computer connections, for example, when data is transferred or provided over a network or another communications connection (either wired, wireless, or a combination thereof). Any combination(s) of the above examples is also included within the scope of the computer-readable media 46. It is therefore to be understood that the method 100 may be at least partially performed by any electronic articles and/or devices capable of carrying out instructions corresponding to one or more steps of the method 100.

With continued reference to FIG. 2, the method 100 may begin at block 102. At block 102, the controller 34 detects that the vehicle 10 is being driven based on, for example, one or more signals from the sensors 40. The controller 34 may alternatively detect that the vehicle 10 is being driven based on user inputs received from the user interface 23. Irrespective on how the controller 34 detects that the vehicle 10 is being driven, the vehicle 10 may be driven by the vehicle user or the control system 98. Because the vehicle 10 may be an autonomous vehicle, the vehicle user does not necessarily drive the vehicle 10. Rather, the control system 98 may operate and drive the vehicle 10. After block 102, the method 100 proceeds to block 104.

At block 104, the controller 34 is configured to detect one or more minor external force events based on at least one signal from the sensors 40 (e.g., IMU). Minor external force events may occur during certain predetermined driving conditions, such as when the vehicle 10 drives over potholes or speed bumps or when the vehicle 10 hits a curb or another object. To determine whether a minor external force event has occurred, one or more sensors 40 sense whether an external force has been exerted on the vehicle 10 and whether such external force has a magnitude that is between a first predetermined value and a second predetermined value. The first predetermined value and the second predetermined value are different and may be determined by testing the vehicle 10. The controller 34 may directly or indirectly measure the magnitude of the external force exerted on the vehicle 10 to determine whether a minor external force event has occurred. As a non-limiting example, an IMU, which may be one of the sensors 40, includes an accelerometer and may measure the magnitude of the acceleration of the vehicle 10 to detect a minor external force event. Specifically, the IMU may detect that an external force has been exerted on the vehicle 10 by measuring the acceleration of the vehicle 10. The IMU then generates and transmits a signal to the controller 34. The signal generated by the IMU is indicative of the acceleration of the vehicle 10. Upon receipt of the signal from the IMU, the controller 34 uses this signal to determine whether the acceleration of the vehicle 10 has a magnitude that is between the first acceleration value and the second acceleration value. If the magnitude of the acceleration of the vehicle 10 is between the first acceleration value and the second acceleration value, then the controller 34 determines that the vehicle 10 has experienced a minor external force event. In this way, the IMU indirectly measures the magnitude of the external force exerted on the vehicle 10, and the controller 34 indirectly determines that the external force exerted on the vehicle 10 has a magnitude that is between the first predetermined value and the second predetermined value. If the controller 34 does not detect a minor external force event, then the method 100 returns to block 102. On the other hand, if the method 100 determines that a minor external force event has occurred, then the method 100 proceeds to block 106.

At block 106, the controller 34 commands the vehicle 10 to provide the vehicle user with an alert, notifying the vehicle user that a wheel alignment check should be performed. Thus, the alert is indicative that the wheel alignment check should be performed and may be, for example, a message shown on the display 29 and/or an audible sound produced by the speakers 27. As a non-limiting example, in response to determining that the magnitude of the external force exerted on the vehicle 10 is between the first predetermined value and the second predetermined value, the controller 34 may command the display 29 to display the alert as a pop-up notification, informing the vehicle user that a wheel alignment should be performed. It is desirable to notify a vehicle user that a wheel alignment check should be performed after the vehicle 10 has experienced a minor external force event to identify potential wheel alignment issues.

The method 100 also includes block 108, which is executed after block 102. At block 108, the controller 34 determines whether a major external force event has occurred. Major external force events occur when an external force is exerted on the vehicle 10 and the magnitude of such external force is equal to or greater than a third predetermined value. Third predetermined value is greater than the first predetermined value and the second predetermined value to allow the controller 34 to distinguish between a major external force event and a minor external force event. To determine whether a major external force event has occurred, one or more sensors 40 sense whether an external force has been exerted on the vehicle 10 and whether such external force has a magnitude that is equal to or greater than the third predetermined value. The third predetermined value may be determined by testing the vehicle 10. The controller 34 may directly or indirectly measure the magnitude of the external force exerted on the vehicle 10 to determine whether a major external force event has occurred. As a non-limiting example, an IMU, which may be one of the sensors 40, includes an accelerometer and may measure the magnitude of the acceleration of the vehicle 10 to detect a major external force event. Specifically, the IMU may detect that an external force has been exerted on the vehicle 10 by measuring the acceleration of the vehicle 10. The IMU then generates and transmits a signal to the controller 34. The signal generated by the IMU is indicative of the acceleration of the vehicle 10. Upon receipt of the signal from the IMU, the controller 34 uses this signal to determine whether the acceleration of the vehicle 10 has a magnitude that is equal to or greater than a third acceleration value, which is greater than the first acceleration value and the second acceleration value. If the magnitude of the acceleration of the vehicle 10 is equal to or greater than the third acceleration value, then the controller 34 determines that the vehicle 10 has experienced a major external force event. In this way, the IMU indirectly measures the magnitude of the external force exerted on the vehicle 10, and the controller 34 indirectly determines that the external force exerted on the vehicle 10 has a magnitude that is equal to or greater than the third predetermined value. If the controller 34 does not detect a major external force event, then the method 100 returns to block 102. On the other hand, if the method 100 determines that a major external force event has occurred, then the method 100 proceeds to block 110.

At block 110, the controller 34 determines whether the airbags 35 have been deployed. As a non-limiting example, the controller 34 or another controller of the vehicle 10 may be configured to deploy the airbags 35 when the magnitude of an external force exerted on the vehicle 10 is greater than a fourth predetermined value. The fourth predetermined value is greater than the third predetermined value. Thus, because the controller 34 may command the airbags 35 to deploy, the controller 34 is configured to determine that the airbags 35 have been deployed. Alternatively, the controller 34 may receive data from other controllers 34 in the vehicle 10 that indicates that the airbags 35 have been deployed. If the controller 34 determines that the airbags 35 have not been deployed, then the method 100 proceeds to block 106. As discussed above, at block 106, the controller 34 commands the display 29 to provide the vehicle user with an alert, notifying the vehicle user that a wheel alignment check should be performed. It is desirable to notify a vehicle user that a wheel alignment check should be performed after the vehicle 10 has experienced a major external force event to identify potential wheel alignment issues. If the controller 34 determines that one or more airbags 35 have been deployed, then the method 100 proceeds to block 112.

At block 112, the controller 34 transmits a signal to another entity 48, such as a remote call center (e.g., ON-STAR by GENERAL MOTORS). This signal may include data about the vehicle 10, such a location of the vehicle 10 and information about the airbags 35. For instance, this data may notify the remote call center that the airbags 35 of the vehicle 10 have been deployed. At block 112, the controller 34 may open a line of communication with the remote call center using the communication system 36 to allow the vehicle user to communicate with a person at the remote call center.

After executing block 102, the method 100 also continues to block 112. At block 112, the controller 34 monitors the distance traveled by the vehicle 10 based on the signal of at least one of the sensors 40, such as an odometer. The controller 34 is also configured to determine whether the vehicle 10 has traveled by the distance from a specific moment in time (e.g., a reset time) or since the last check point is equal to or greater than a predetermined distance threshold based on at least one signal received from one or more sensors 40 (e.g., odometer). The "last check point" means the point in time when the last wheel alignment check was performed. The predetermined distance threshold may be determined by testing the vehicle 10. As a non-limiting example, the predetermined distance threshold may be 10,000 miles. If the controller 34 determines that the distance traveled by the vehicle 10 since the specific moment in time is less than the predetermined distance threshold (e.g., 10,000 miles), then the alert indicating that the wheel alignment check should be performed is not provided, and the method 100 returns to block 102. However, if the controller 34 determines that the distance traveled by the vehicle 10 since the specific moment in time is equal to or greater than the predetermined distance threshold, then the method 100 proceeds to block 106. It is desirable to conduct a wheel alignment check once the vehicle 10 has been driven certain miles to identify potential wheel misalignment. If a wheel misalignment is detected, a wheel alignment procedure may be performed to extend the life of the vehicle tires.

Figure 3:
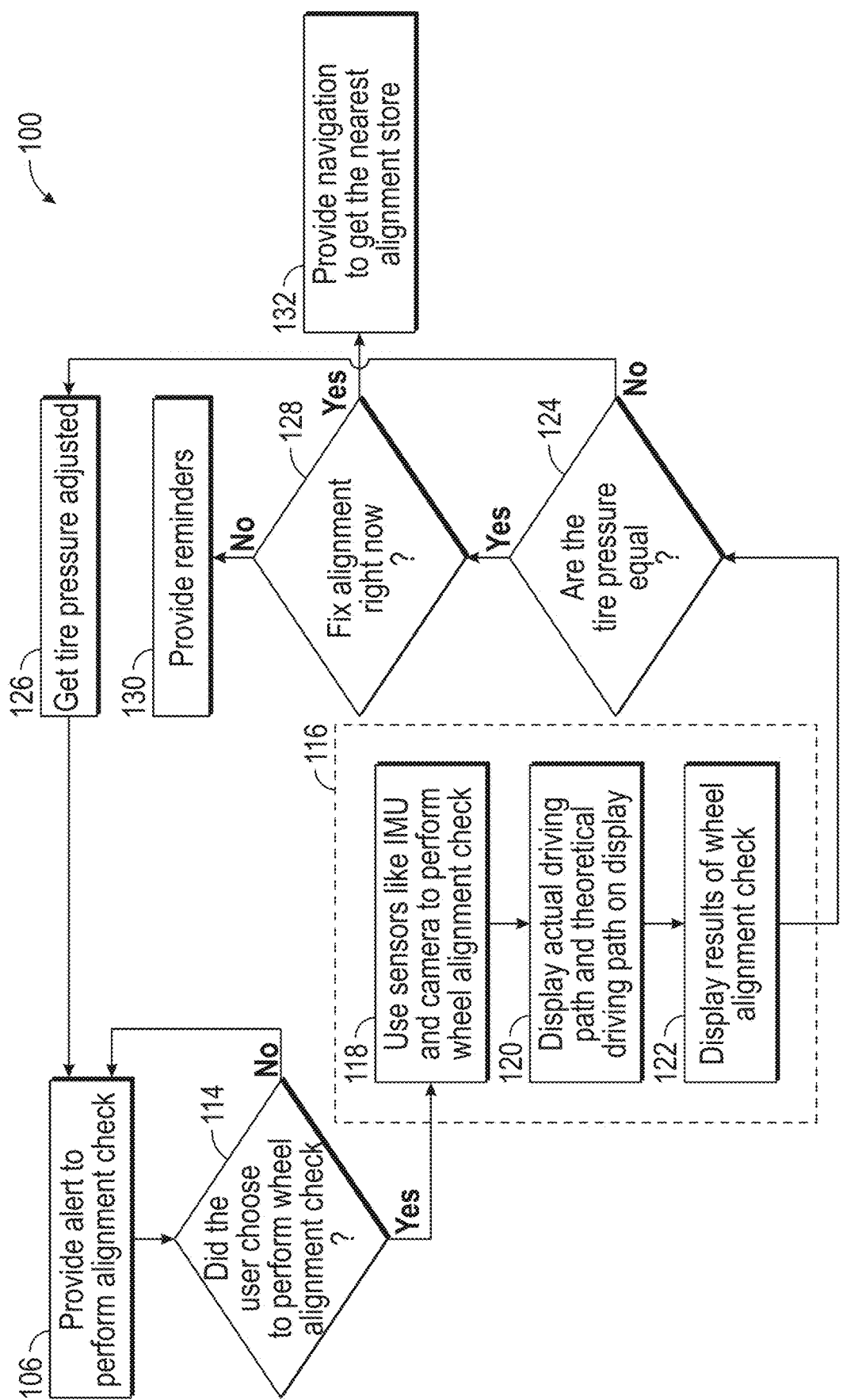
FIG. 3 is a flowchart of another part of the automatic wheel alignment detection method of FIG. 2.

FIG. 3 is another part of the method 100, which shows the block 106 described above. In addition to the instructions described above, at block 106, the controller 34 commands the user interface 23 to provide a selection prompt while providing the alert. In other words, the user interface 23 may provide the selection prompt at the same time as the alert is provided. The selection prompt allows the vehicle user to select whether he or she wants to perform a wheel alignment check. For instance, the display 29 may show a visual selection prompt with options for the user. One option is to perform the wheel alignment check, and another option is to decline the wheel alignment check. The controller 34 may alternatively or additionally command the speakers 27 to produce an audible selection prompt, asking the vehicle user if he or she wants to conduct a wheel alignment check. Regardless of how the selection prompt is produced, the vehicle user now has an opportunity to select whether to conduct the wheel alignment check. At this point, the vehicle user may accept or decline the wheel alignment check. To do so, the vehicle user may provide a user input through the user interface 23. As discussed above, the user interface 23 may include a touch screen or buttons to enable the vehicle user to provide this user input. Once the vehicle user makes the selection, the user interface 23 communicates such selection to the controller 34. The controller 34 then receives the selection by the vehicle user. Thus, the controller 34 is configured to determine that the vehicle user wants to conduct the wheel alignment check based on the user input. If the vehicle user does not want to conduct the wheel alignment check, then the method 100 returns to block 114. If the vehicle user wants to perform the wheel alignment check, then the method 100 proceeds to block 116.

At block 116, the controller 34 conducts an automatic or a semiautomatic wheel alignment check, which may include several substeps 118, 120, and 122 as discussed below. To initiate the wheel alignment check, the controller 34 instructs the vehicle user, through the user interface 23, to drive to a location that has a minimum distance of straight path space (e.g., 100 meters of straight path space). This location may be a parking lot or a roadway that has a straight path space. Alternatively, the controller 34 may command the vehicle 10 to autonomously drive to such location. Once the vehicle 10 reaches this location, the controller 34 executes substep 118.

Figure 4A:
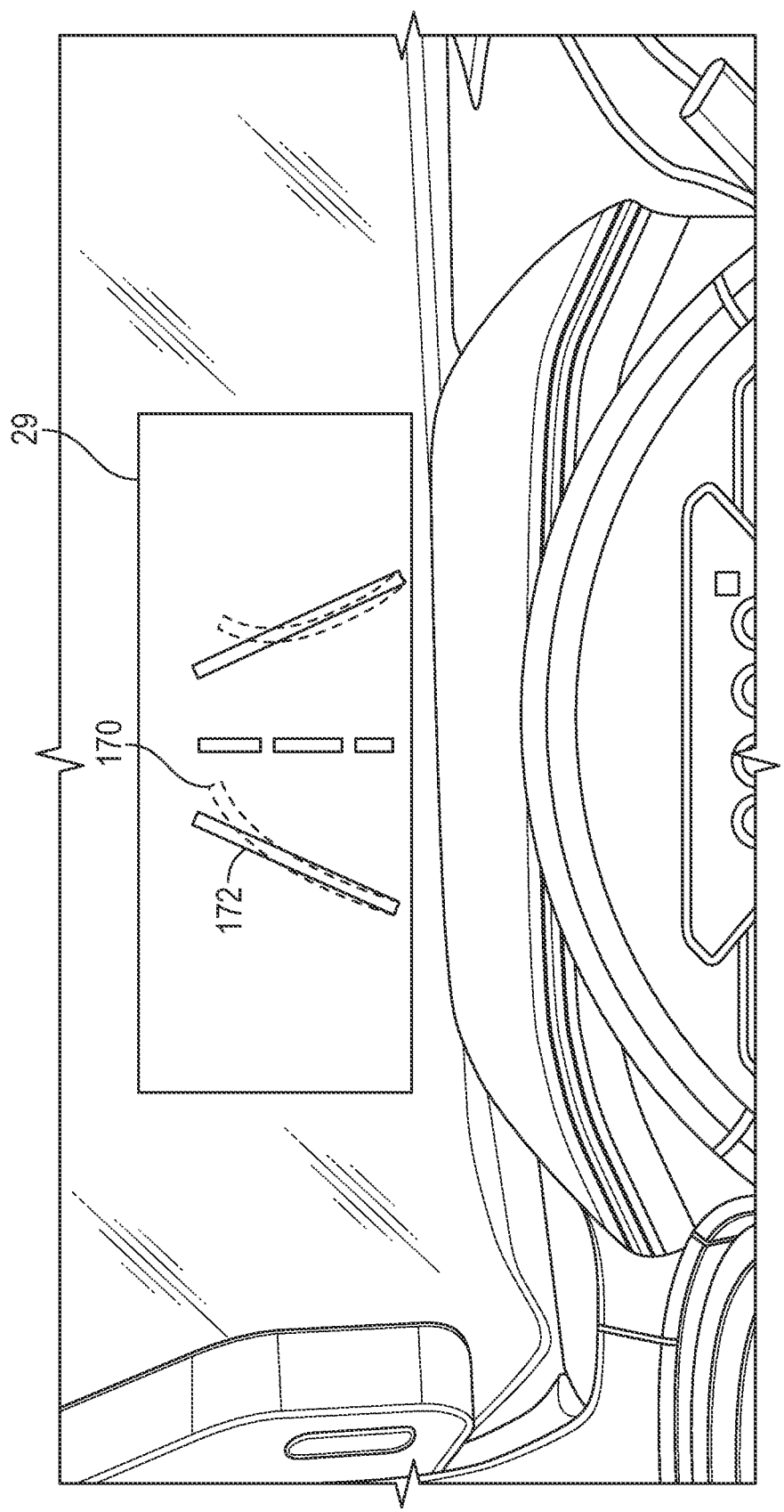
FIG. 4A is a schematic front view of a display of the vehicle of FIG. 1, showing a wheel alignment check image, wherein the display is configured as a head-up display (HUD)
Figure 4B:
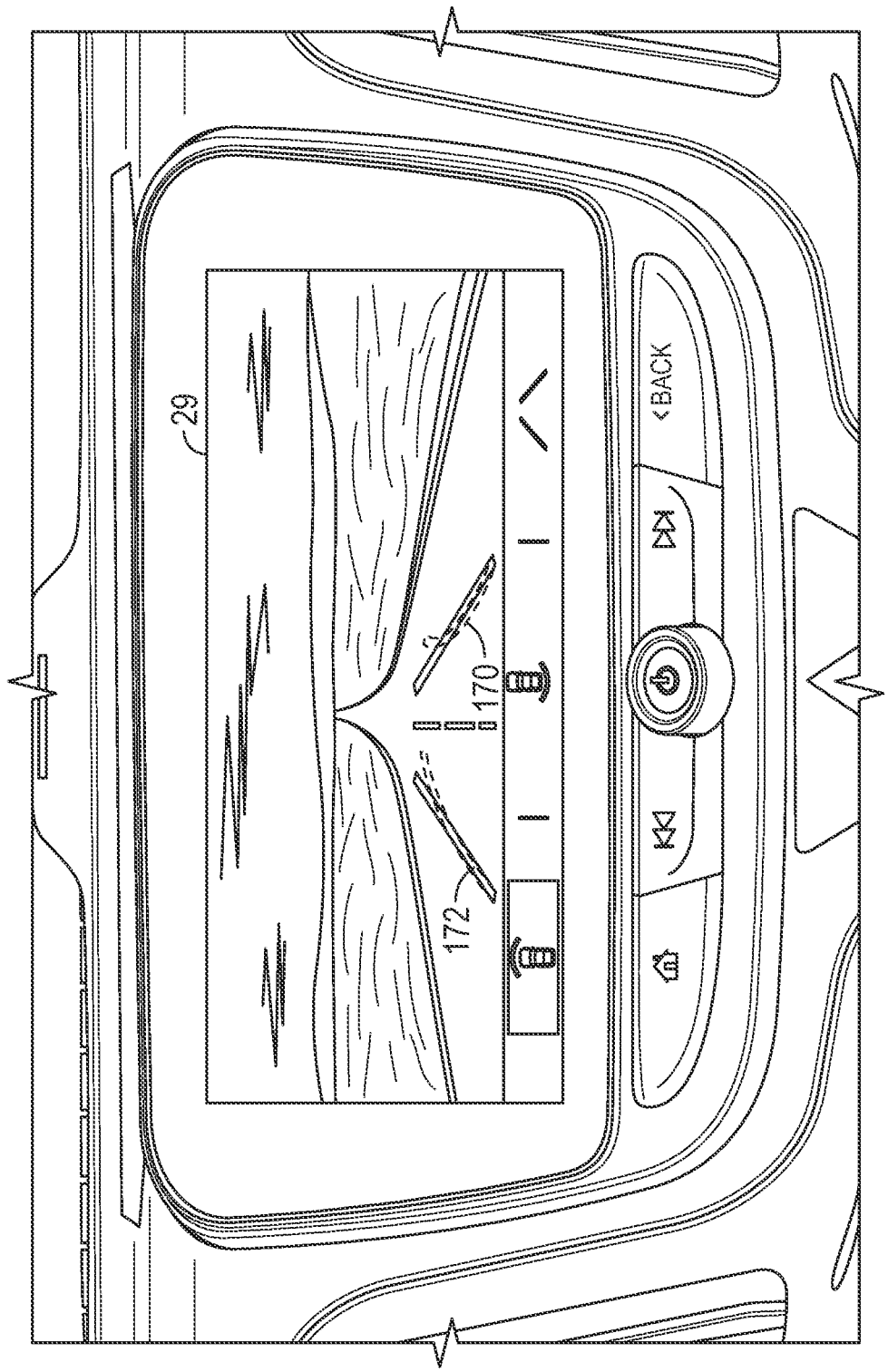
FIG. 4B is a schematic front view of a display of the vehicle of FIG. 1, showing a wheel alignment check image, wherein the display is configured as an infotainment center display.

At substep 118, the controller 34 may command the vehicle 10 to perform the wheel alignment check automatically if the vehicle 10 is an autonomous vehicle or may instruct the vehicle user, through for example the user interface 23, to perform certain steps to conduct the wheel alignment check semiautomatically. If the vehicle 10 is an autonomous vehicle, the controller 34 commands the steering system 24 of the vehicle 10 to set its steering to drive on a straight path at predetermined speed (e.g., five miles per hour). It is desirable to perform the wheel alignment check while the vehicle 10 is driven on a straight path at a relatively low speed (i.e., the predetermined speed) to minimize errors during the wheel alignment check. As discussed above, in a semiautomatic case, the controller 34 may instead instruct the vehicle user to following certain steps to initiate the wheel alignment check. In doing so, the controller 34 commands the display 29 show a first instruction. The first instruction entails asking the vehicle user to position a steering wheel 33 of the vehicle 10 such that the vehicle 10 moves in a straight path. Then, the controller 34 commands the display 29 to display a second instruction. The second instruction entails asking the vehicle user to accelerate the vehicle slowly up to the predetermined speed without altering the steering direction. In other words, the second instruction entails asking the vehicle user to accelerate the vehicle 10 at a predetermined acceleration up to the predetermined speed while maintaining the steering wheel 33 positioned to drive the vehicle 10 in a straight path. Once the vehicle 10 is being driven (autonomously or by the vehicle user) at the predetermined speed in a straight path, the sensors 40, such as the IMU and cameras, detects the actual vehicle path 170 and the predetermined expected path 172 (as shown in FIG. 4A and FIG. 4B) while the vehicle is in motion. The sensors 40 then transmit one or more signals indicative of the actual vehicle path 170 to the controller 34. The controller 34 then determines the actual vehicle path 170 based on the signals received from one or more sensors 40. The method 100 then continues to substep 120.

At substep 120, the controller 34 generates an image showing the actual vehicle path 170 and the predetermined expected path 172. The image may show the actual vehicle path 170 overlapping or deviating from the predetermined expected path 172. As discussed below, the predetermined expected path may be determined based on the signal from one or more sensors 40, such as a steering angle sensor. Alternatively, the predetermined expected path may be determined by testing the vehicle 10 and may be stored on the computer readable storage media 46.

FIG. 4A shows the display 29 of the vehicle 10, showing the actual vehicle path 170 and the predetermined expected path 172. In the depicted embodiment, the display 29 is configured as a HUD. However, it is envisioned that the display 29 may have other configurations, such as an information cluster display or an infotainment center display. For example, the display 29 is configured as an infotainment center display.

Returning to FIG. 3, at substep 120, the controller 34 may determine (e.g., calculate) a path offset between the actual vehicle path 170 and the predetermined expected path 172. Then, the method 100 continues to substep 122. At substep 122, the controller 34 determines whether a wheel alignment is recommended based on the value of the path offset and commands the display 29 to display the results of the wheel alignment check. The results of the wheel alignment check may include the path offset, the actual vehicle path 170, the predetermined expected path 172, and/or a notification indicating whether a wheel alignment is recommended based on the value of the path offset. If a wheel alignment is recommended, the method 100 proceeds to block 124. As discussed below with respect to FIG. 5, if the controller 34 determines that a wheel alignment is not recommended based on the value of the path offset, the controller 34 commands the display 29 to provide a notification that no wheel alignment issues were detected.

With continued reference to FIG. 3, at block 124, the sensors 40, such as tire pressure sensors, may measure the tire pressure of tires of the vehicle 10 and transmit signals indicative of the tire pressure to the controller 34. The controller 34 then determines the tire pressure of each vehicle tire based on the signals from the sensors 40 (e.g., tire pressure sensors). Then, the controller 34 determines whether the tire pressures of all the tires are substantially equal. In the present disclosure, the term "substantially equal" means a value that may vary ±5%. If the tire pressures of all the tires are not substantially equal, then the method 100 proceeds to block 126. It is envisioned that the vehicle user may manually measure the tire pressure of the vehicle tires. At block 126, the vehicle user or a mechanic may adjust the tire pressures until all the tire pressures of the vehicle tires are substantially equal. Next, the method 100 returns to block 106. If the tire pressures of all the vehicle tires are substantially equal, then the method 100 proceeds to block 128.

At block 128, the controller 34 commands the user interface 23 to ask the vehicle user whether he or she wants to fix the wheel alignment now. To do so, the controller 34 may command the display 29 to display a question to the user (e.g., "Fix wheel alignment now?"). The vehicle user may answer this question through the user interface 23 by providing a user input. The controller 34 receives this user input and determines whether the vehicle user wants to fix the wheel alignment now. If the vehicle user does not want to fix the wheel alignment now, then the method 100 proceeds to block 130. If the vehicle user wants to fix the wheel alignment now, then the method 100 proceeds to block 132.

At block 130, the controller 34 provides reminders at predetermined time interval (e.g., once a day) that the wheel alignment should be performed. These reminders may be displayed on the display 29. The user may disable the reminders through the user interface 23.

At block 132, the controller 34 commands the GNSS transceiver of the sensor system 28 to transmit a signal to a satellite to find the location of the nearest auto repair shop. The satellite returns a signal with the location one or more of the nearest auto repair shops as well as navigation data to the identified auto repair shops. The controller 34 commands the display 29 to display the navigation instructions to the auto repair shop. If the vehicle 10 is an autonomous vehicle, the controller 34 may command the vehicle 10 to drive to the auto repair shop if the user accepts to go to the shop. In other words, if the misalignment is detected, then controller 34 may: (1) provide the nearby auto shop options, and the user could then select the one that works best for them to fix the wheel alignment; (2) make a reservation at the auto shop to fix the wheel alignment later; or (3) the controller 34 could provide the user with reminders in the future.

Figure 5:
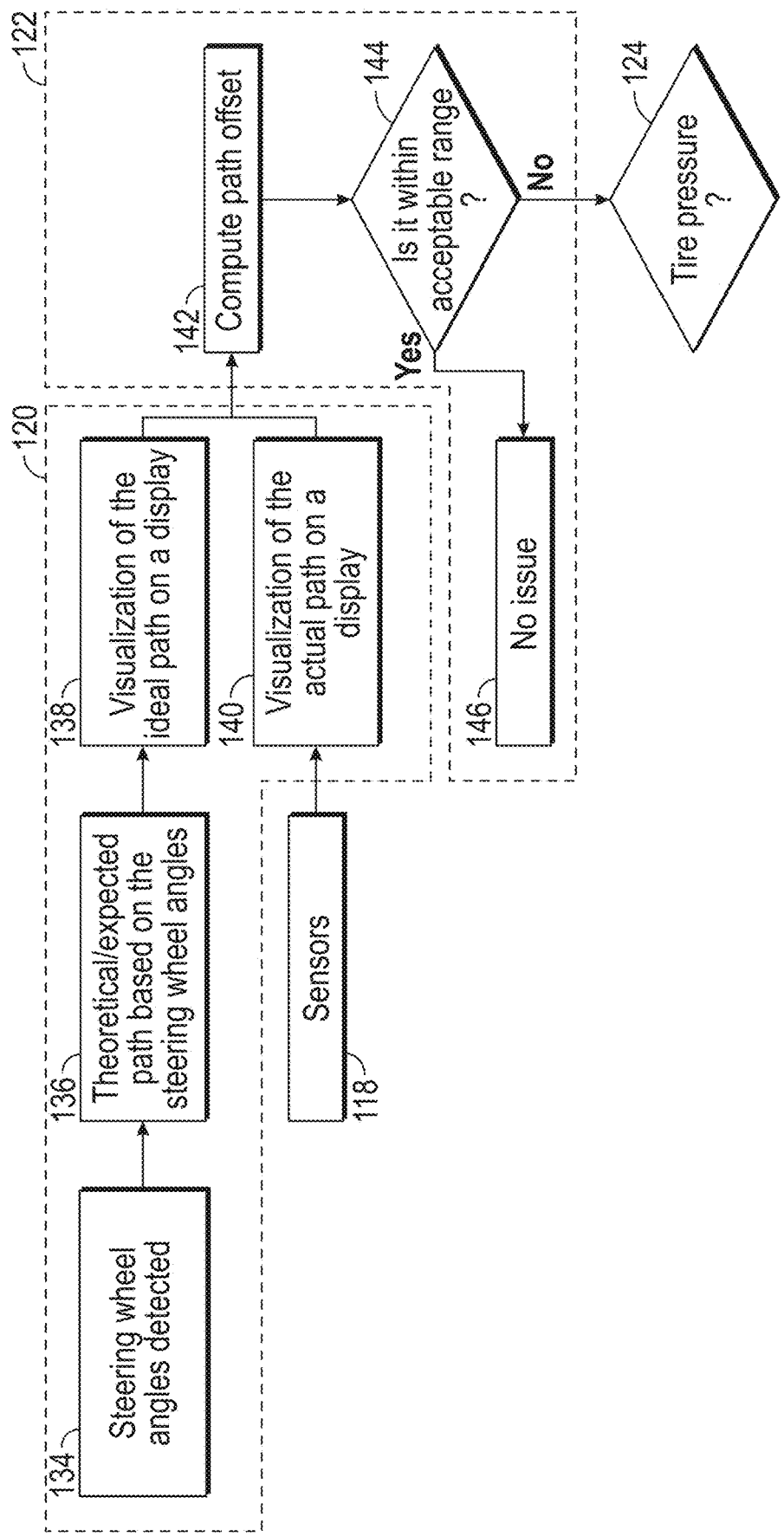
FIG. 5 is a flowchart of yet another part of the automatic wheel alignment detection method of FIG. 2.

With reference to FIG. 5, as discussed above, substep 120 entails generating an image showing the actual vehicle path 170 and the predetermined expected path 172. To do so, substep 120 may include other substeps 134, 136, 138, and 140. Substep 134 entails detecting a steering wheel angle of the steering wheel 33 while the vehicle 10 is moving at the predetermined speed in the straight path. One or more sensors 40, such as a steering wheel angle sensor, may be used to measure the steering wheel angle of the steering wheel 33. These sensors 40 then generate one or more signals indicative of the steering wheel angle, and these signals are transmitted to the controller 34. The controller 34 then determines the steering wheel angle based on these signals from the sensors. The method 100 then proceeds to substep 136.

At substep 136, the controller 34 determines the predetermined expected path 172 based on the signals from the sensors 40 (e.g., the steering wheel angle sensor). Alternatively, the predetermined expected path 172 may be determined based on theoretical straight line stored on the controller 34. Once the predetermined expected path has been determined, the method 100 continues to substep 138. At substep 138, the controller 34 generates an image (i.e., a visualization) of the predetermined expected path 172 and commands the display 29 to display the predetermined expected path 172.

Substep 120 also includes substep 140, in which the controller 34 generates an image (i.e., a visualization) of the actual vehicle path 170. As discussed above with respect to substep 118, the controller 34 receives one or more signals from the sensors 40, such as IMU and/or cameras, and these signals are used to generate the images of the actual vehicle path 170 at substep 140.

The actual vehicle path 170 may be determined in different ways. For example, the controller 34 may receive gyroscope readings from one or more sensors 40, such as an IMU or a standalone gyroscope, over a predetermined period of time while the vehicle 10 is moving at the predetermined speed in the straight path. Using the gyroscope readings, the controller 34 determines the angular movement of the vehicle 10 by converting the raw data from the sensors 40 to degrees per second. These degrees per seconds are then averaged over time to determine the actual vehicle path 170. In another example, the controller 34 may receive readings from a sensor 40, such as a standalone 3-axis accelerometer or an IMU, to determine the acceleration of the vehicle 10 and its deviation for a theoretical straight line. In yet another example, the controller 34 may use readings from a combination of sensors 40, such as the accelerometer and the gyroscope. The controller 34 then computes an estimate of these combined readings to determine the actual vehicle path 170. This estimate may be a normalized weighted estimate, which is an estimate of the external force applied which takes in to account the importance of the accelerometer/gyro using a weight term and is normalized to ease calculations. Alternatively, the controller 34 may use readings of one or more sensor 40, such as a steering wheel angle, to estimate the front wheel angle. The estimation of the front wheel angle is then used to determine the actual vehicle path 170. Regardless of the method employed, all the sensor readings are collected over a predetermined period of time while the vehicle 10 is moving at the predetermined speed and the steering wheel 33 is positioned to drive the vehicle 10 in a straight path. After executing substeps 138 and 140, the method 100 proceeds to substep 122.

Substep 122 may include substeps 142, 144, and 146. At block 142, the controller 34 determines (i.e., computes) the path offset of the actual vehicle path 170 relative to the predetermined expected path 172. To do so, the controller 34 may compare the actual vehicle path 170 with the predetermined expected path 172 of the vehicle 10 to determine the path offset. For instance, the controller 34 may be programmed to calculate the difference between the actual vehicle path 170 and the predetermined expected path 172, and such difference is determined to be the path offset. The method 100 then proceeds to substep 144.

At substep 144, the controller 34 determines whether the path offset is greater than a predetermined offset threshold. The predetermined offset threshold may be determined by testing the vehicle 10. If the path offset is not greater than the predetermined offset threshold, then the method 100 proceeds to block 146. At block 146, the controller 34 commands the display 29 to provide a notification that no wheel alignment issues were detected. If the path offset is greater than the predetermined offset threshold, then the method 100 proceeds to block 124, which is described above.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

What is claimed is:

1. A wheel alignment detection system for a vehicle, the system comprising:
   a plurality of sensors, wherein each of the plurality of sensors is configured to generate a signal;
   a controller in communication with the plurality of sensors, wherein the controller is configured to:
      detect an external force exerted on the vehicle based on the signal from at least one of the plurality of sensors;
      determine whether the external force exerted on the vehicle has a magnitude that is between a first predetermined value and a second predetermined value;
      command the vehicle to provide an alert in response to determining that the magnitude of the external force exerted on the vehicle is between the first predetermined value and the second predetermined value, wherein the alert is indicative that a wheel alignment check should be performed;
   a display in communication with the controller, wherein the controller is configured to command the display to display the alert that is indicative that the wheel alignment check should be performed;
   wherein the controller is further configured to:
   monitor a distance traveled by the vehicle;
   determine whether the distance traveled by the vehicle since a last check point is equal to or greater than a predetermined distance threshold; and
   command the display to display the alert in response to determining that the distance traveled by the vehicle is equal to or greater than the predetermined distance threshold.

2. The system of claim 1, further comprising at least one airbag in the vehicle, wherein the airbag is in communication with the controller, and the controller is configured to:
   determine that the magnitude of the external force exerted on the vehicle is greater than a third predetermined value, wherein the third predetermined value is greater than the first predetermined value and the second predetermined value;

determine whether the at least one airbag has been deployed based on the signal from at least one of the plurality of sensors; and command the display to provide the alert in response to determining that the at least one airbag has not been deployed and determining that the magnitude of the external force exerted on the vehicle is greater than the third predetermined value, wherein the alert is indicative that the wheel alignment check should be performed.

3. The system of claim 1, wherein the controller is configured to:

command the display to provide a selection prompt to allow a vehicle user to select whether to perform the wheel alignment check while providing the alert;

receiving a user input by the vehicle user, wherein the user input is a selection by the vehicle user to perform the wheel alignment check;

determine that the vehicle user wants to perform the wheel alignment check based on the user input; and command the vehicle to perform the wheel alignment check in response to receiving the user input.

4. The system of claim 3, wherein the controller is configured to:

determine an actual vehicle path of the vehicle while the vehicle is moving based on the signal from at least one of the plurality of sensors;

compare the actual vehicle path of the vehicle with a predetermined expected path to determine a path offset; and determine whether the path offset is greater than a predetermined offset threshold.

5. The system of claim 4, wherein the controller is configured to:

generate an image showing the actual vehicle path overlapping or deviating from the predetermined expected path; and command the display to display the image showing the actual vehicle path overlapping or deviating the predetermined expected path.

6. The system of claim 5, wherein the wheel alignment check is performed automatically by the vehicle, and the vehicle operates autonomously.

7. The system of claim 5, wherein the controller is configured to:

instruct the vehicle user to position a steering wheel of the vehicle such that the vehicle moves in a straight path; and instruct the vehicle user to accelerate the vehicle to a predetermined speed without altering a position of the steering wheel.

8. The system of claim 7, wherein the controller is configured to:

command the display to show results of the wheel alignment check if a wheel misalignment is detected;

detect the wheel misalignment;

in response to detecting the wheel misalignment, perform at least one of:

(1) provide the vehicle user with nearby auto shop options and receiving an auto shop selection from the vehicle user to fix the wheel alignment;

(2) make a reservation at one of the nearby auto shop options to fix the wheel alignment later; or (3) provide the vehicle user with reminders in the future at predetermined time interval.

9. A wheel alignment detection method for a vehicle, comprising:

detecting an external force exerted on the vehicle;

determining whether a magnitude of the external force exerted on the vehicle is between a first predetermined value and a second predetermined value;

commanding the vehicle to provide an alert in response to determining that the external force exerted on the vehicle is between the first predetermined value and the second predetermined value, wherein the alert is indicative that a wheel alignment check should be performed;

commanding a display of the vehicle to display the alert to a vehicle user;

monitoring a distance traveled by the vehicle;

determining whether the distance traveled by the vehicle is equal to or greater than a predetermined distance threshold; and commanding the vehicle to provide the alert in response to determining that the distance traveled by the vehicle is equal to or greater than the predetermined distance threshold.

10. The method of claim 9, further comprising:

detecting that the magnitude of the external force exerted on the vehicle is greater than a third predetermined value, and the third predetermined value is greater than the first predetermined value and the second predetermined value;

determining whether at least one airbag in the vehicle has been deployed; and commanding the vehicle to provide the alert in response to determining that the at least one airbag has not been deployed and detecting that the magnitude of the external force exerted on the vehicle is greater than the third predetermined value.

11. The method of claim 9, further comprising:

prompting a vehicle user of the vehicle to select whether to perform the wheel alignment check in response to providing the alert, wherein a selection of the vehicle user is a user input; and commanding the vehicle to perform the wheel alignment check in response to receiving the user input that the wheel alignment check will be performed.

12. The method of claim 11, further comprising:

detecting an actual vehicle path of the vehicle while the vehicle is in motion;

comparing the actual vehicle path of the vehicle with a predetermined expected path to determine a path offset; and determining whether the path offset is greater than a predetermined offset threshold.

13. The method of claim 12, further comprising:

generating an image showing the actual vehicle path overlapping or deviating the predetermined expected path in response to determining that the path offset is greater than the predetermined offset threshold; and commanding a display of the vehicle to display the image showing the actual vehicle path overlapping or deviating the predetermined expected path.

14. The method of claim 13, wherein the wheel alignment check is performed automatically by the vehicle.

15. The method of claim 13, further comprising:

instructing the vehicle user to position a steering wheel of the vehicle such that the vehicle moves in a straight path; and instructing the vehicle user to accelerate the vehicle to a predetermined speed without altering a position of the steering wheel.

16. The method of claim 15, further comprising displaying results of the wheel alignment check.

* * * * *